(12) United States Patent
Marupaduga

(10) Patent No.: US 12,047,820 B1
(45) Date of Patent: Jul. 23, 2024

(54) USE OF AN ACCESS NODE'S SECONDARY-NODE-ADDITION-FAILURE HISTORY AS A BASIS TO CONTROL WHETHER A UE WILL CONNECT WITH THE ACCESS NODE

(71) Applicant: T-Mobile USA, Inc., Bellevue, WA (US)

(72) Inventor: Sreekar Marupaduga, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 210 days.

(21) Appl. No.: 16/949,267

(22) Filed: Oct. 22, 2020

(51) Int. Cl.
*H04W 36/00* (2009.01)

(52) U.S. Cl.
CPC ... *H04W 36/0069* (2018.08); *H04W 36/0083* (2013.01)

(58) Field of Classification Search
None
See application file for complete search history.

(56) References Cited

U.S. PATENT DOCUMENTS

| | | | |
|---|---|---|---|
| 2011/0171952 A1* | 7/2011 | Niu | H04W 28/08 455/422.1 |
| 2019/0159097 A1* | 5/2019 | Tang | H04W 36/22 |
| 2019/0166646 A1* | 5/2019 | Shih | H04W 72/04 |
| 2019/0274179 A1* | 9/2019 | Vajapeyam | H04L 1/1887 |
| 2020/0084683 A1* | 3/2020 | Moosavi | H04W 36/24 |
| 2021/0051749 A1* | 2/2021 | Adusumilli | H04W 76/27 |
| 2021/0058829 A1* | 2/2021 | Ozturk | H04W 12/0433 |
| 2021/0258852 A1* | 8/2021 | Selvaganapathy | H04W 36/0069 |

OTHER PUBLICATIONS

Random House Webster's College Dictionary, 86 (2nd Random House ed. 1999) (defining "attempt" as "to make an effort at; try; to undertake: to attempt a difficult task").*

* cited by examiner

*Primary Examiner* — Yuwen Pan
*Assistant Examiner* — Alexander J Yi
(74) *Attorney, Agent, or Firm* — Lee & Hayes P.C.

(57) ABSTRACT

A method and system for controlling whether a user equipment device (UE) that is not connected with an access node will connect with the access node. An example method includes making a determination of whether the access node has experienced a threshold high extent of secondary-node-addition failures, each secondary-node addition failure being an instance where the access node attempted secondary-node-addition for dual-connectivity service and the attempted secondary-node-addition failed. And the example method includes using the determination as a basis to control whether the UE that is not connected with the access node will connect with the access node. Without limitation, this example method could be carried out by the UE when the UE is seeking to acquire initial wireless connectivity or considering handover to the access node, or the method could be carried out by a source access node considering handover of the UE to the access node.

13 Claims, 5 Drawing Sheets

---

MAKE A DETERMINATION OF WHETHER AN ACCESS NODE WITH WHICH A UE IS NOT CONNECTED HAS EXPERIENCED A THRESHOLD HIGH EXTENT OF SECONDARY-NODE-ADDITION FAILURES, EACH SECONDARY-NODE ADDITION FAILURE BEING AN INSTANCE WHERE THE ACCESS NODE ATTEMPTED SECONDARY-NODE-ADDITION FOR DUAL-CONNECTIVITY SERVICE AND THE ATTEMPTED SECONDARY-NODE-ADDITION FAILED — 44

USE THE DETERMINATION AS A BASIS TO CONTROL WHETHER THE UE THAT IS NOT CONNECTED WITH THE ACCESS NODE WILL CONNECT WITH THE ACCESS NODE — 46

1

USE OF AN ACCESS NODE'S SECONDARY-NODE-ADDITION-FAILURE HISTORY AS A BASIS TO CONTROL WHETHER A UE WILL CONNECT WITH THE ACCESS NODE

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency.

Further each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

On the downlink and uplink, the air interface provided by an access node on a given carrier could be configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes.

For instance, on the downlink, certain resource elements could be reserved to carry synchronization signals that UEs could detect as an indication of the presence of coverage, other resource elements could be reserved to carry a reference signal that UEs could measure in order to gauge coverage strength (or a synchronization signal could be used as such a reference signal), other resource elements could be reserved to carry period system broadcast messages, such as a master information block (MIB) and various system information blocks (SIBs), from the access node to UEs, and other resource elements could be reserved to carry other control signaling such as PRB-scheduling directives and acknowledgement messaging from the access node to UEs.

And on the uplink, certain resource elements could be reserved to carry random-access signaling from UEs to the access node, and other resource elements could be reserved to carry other control signaling such as PRB-scheduling requests, acknowledgement messaging, and channel-quality reports from UEs to the access node.

Overview

When a UE enters into coverage of such a system, the UE could detect threshold strong coverage of an access node on a carrier (e.g., a threshold strong reference signal broadcast by the access node on that carrier) and could then engage in random-access and connection signaling with the access node to establish an air-interface connection, such as a Radio Resource Control (RRC) connection, through which the access node will then serve the UE on the carrier.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway (e.g., user plane function) that provides connectivity with a transport network and a data-radio-bearer (DRB) portion that extends over the air between the access node and the UE.

Once the UE is so connected and registered, the access node could then serve the UE over the air-interface connection, managing downlink air-interface communication of data to the UE and uplink air-interface communication of data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs. And the UE could then accordingly transmit the transport block to the access node in the designated PRBs.

In practice, when a UE is so connected with an access node, the UE could also regularly monitor coverage strength from the access node and from one or more other access nodes in the vicinity, to help ensure that the UE is served with the best available coverage. Applying defined measurement thresholds, for instance, if the UE detects that coverage strength from its serving access node is threshold weak and coverage strength from another access node is threshold strong (e.g., threshold stronger than coverage strength from its serving access node), then the UE could provide a measurement report to its serving access node, and the serving access node could coordinate handover of the UE to the other access node.

In addition, when an access node serves a UE, the access node and UE may also support various additional services that help provide the UE with increased peak data rate and improved quality of communications. Without limitation, an example of such service is dual connectivity service, where a UE is served concurrently on multiple air-interface connections.

Dual-connectivity service can be especially beneficial and desirable as the industry advances from one RAT to another, as dual-connectivity in that scenario could involve a UE being served concurrently on a connection according to a legacy RAT and a connection according to a newer and possibly technically-superior RAT. For instance, as the industry advances from 4G LTE to 5G NR, 4G-5G dual-connectivity service such as to as EUTRA-NR Dual Connectivity (EN-DC) may allow the UE to operate concurrently with both a legacy 4G LTE connection and a possibly higher throughput 5G NR connection. Such dual-connectivity service, or "non-standalone" (NSA) service, could be distinguished from standalone (SA) service, where the UE is connected and served according to just a single RAT, such as just 4G LTE or just 5G NR.

In an example dual-connectivity implementation, the UE would have at least two separate and co-existing air-interface connections, including a primary connection (possibly a first-RAT connection) with a first access node that functions as the UE's master node (MN) and a secondary connection (possibly a second-RAT connection) with a second access node that functions as a secondary node (SN) to provide the UE with added bandwidth for user-plane communications. In particular, the access node with which the UE initially connects as noted above could function as the UE's MN and, as such, could be the anchor point for both key RRC signaling and core-network control signaling for service of the UE and could also be responsible for coordinating setup, management, and teardown of dual connectivity for the UE.

Once the UE has established its primary connection with an access node as noted above and has attached with the core network, the UE's serving access node may then engage in a process to establish dual connectivity for the UE, so that the UE can be served concurrently by the MN and the SN.

To do so, the MN could first identify an SN to provide the UE with secondary connectivity. For instance, the MN could direct the UE to scan for secondary coverage on one or more specified carriers, and the UE could scan for and find sufficiently strong coverage of an SN and report that to the MN. Or in certain implementations, the MN could assume that the UE is within sufficiently strong coverage of a particular SN if the MN and SN provide coverage of largely the same direction and scope as each other.

The MN could then engage in an SN-addition process to add for the UE a secondary connection with the SN, so that the MN and SN can then cooperatively provide the UE with dual-connectivity service over their respective connections with the UE.

In an example implementation, for instance, the MN could transmit to the SN an SN-addition request message, providing RRC and DRB configuration information and other information for the secondary connection, and the SN could then responsively allocate resources for the secondary connection and reply to the MN an SN-addition-request acknowledge message. The MN could then transmit to the UE an RRC connection-reconfiguration message providing the UE with parameters of the secondary connection. And the UE could respond to the MN with a reconfiguration-complete message, which the MN could forward to the SN. Further, the UE could then transmit a random-access signal to the SN, and the SN could respond to the UE with a random-access response message, which could complete establishment of the secondary connection for the UE.

Further, for some dual-connectivity implementations, the MN could also engage in a signaling process to transfer the UE's access-bearer from being between the core-network gateway and the MN to instead being between the core-network gateway and the SN. For instance, the MN could include in its SN-addition request to the SN information about the access bearer, and the MN could transmit to the core-network controller an access-bearer modification request and the core-network controller could update the core-network gateway so as to transfer the access-bearer from the MN to the SN.

With dual-connectivity so configured by way of example, the MN and SN could then serve the UE with packet-data communications over their respective connections with the UE, with each access node coordinating air-interface communication in the manner described above. For instance, downlink data could flow over the UE's access bearer from the core-network gateway to the SN, the SN could transmit a portion of the data over the UE's secondary connection to the UE, and the SN could send another portion of the data to the MN, which the MN could transmit to the UE over the UE's primary connection. Likewise, when the UE has data to transmit, the UE could transmit a portion of the data over the UE's primary connection to the MN, which the MN could forward to the SN and the SN could transmit over the UE's access bearer to the gateway, and the UE could transmit another portion of the data over the UE's secondary connection to the SN, which the SN could transmit over the UE's access bearer to the gateway.

Unfortunately, one technical issue that can arise in this process is that, once the MN has identified an SN to provide the UE with secondary connectivity, the SN-addition process could fail. This failure could occur for various reasons. By way of example, the MN may have technical problems engaging in signaling with the SN or with the UE as part of the process. As another example, if the MN assumed that the UE was in strong enough coverage of the SN, that assumption may have been incorrect. And as yet another example, there may be a high level of uplink noise at the SN, which may prevent successful signaling from the UE to the SN to complete setup of the secondary connection. Other examples are possible as well.

Furthermore, some access nodes that could function as MNs for dual connectivity service may often experience SN-addition failure. For instance, a given such access node may have configuration issues that give rise to SN-addition failures, or the SN or SNs that the access node often uses when seeking to set up dual-connectivity service for UEs may have high uplink noise or other issues that give rise to SN-addition failures.

Recognizing this issue, the present disclosure provides for controlling whether or not a UE should connect with an access node as the UE's primary serving access node (e.g., as the UE's sole serving access node and possibly as an MN for dual-connectivity service of the UE), with the controlling being based on an extent to which that access node has experienced SN-addition failures in the past when seeking to set up dual connectivity in which the access node would be MN for the dual connectivity.

In particular, the disclosure addresses a scenario where a UE is not currently connected with the access node but could connect with the access node, either when the UE is initially obtaining wireless connectivity or through handover. In that context, the disclosure provides for a computing system determining an extent to which the access node has experienced SN-addition failures in the past and then using that extent as a basis to control whether the UE will connect with the access node. In particular, if the access node has experienced a threshold great extent of SN-addition failures in the past, then, based on that fact, the computing system could cause the UE to not connect with the access node—and perhaps to connect with a different access node instead. Optimally, avoiding having the UE connect with an access node that has a tendency to experience SN-addition failures may help to avoid inefficiency associated with SN-addition failure.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system that supports 4G LTE service, 5G NR service, and EN-DC service. However, it should be understood that the disclosed principles could extend to apply in other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, operations described as being performed by one or more entities could be implemented in various ways, such as by processing unit executing instructions stored in non-transitory data storage, along with associated circuitry or other hardware, among other possibilities.

Figure 1:
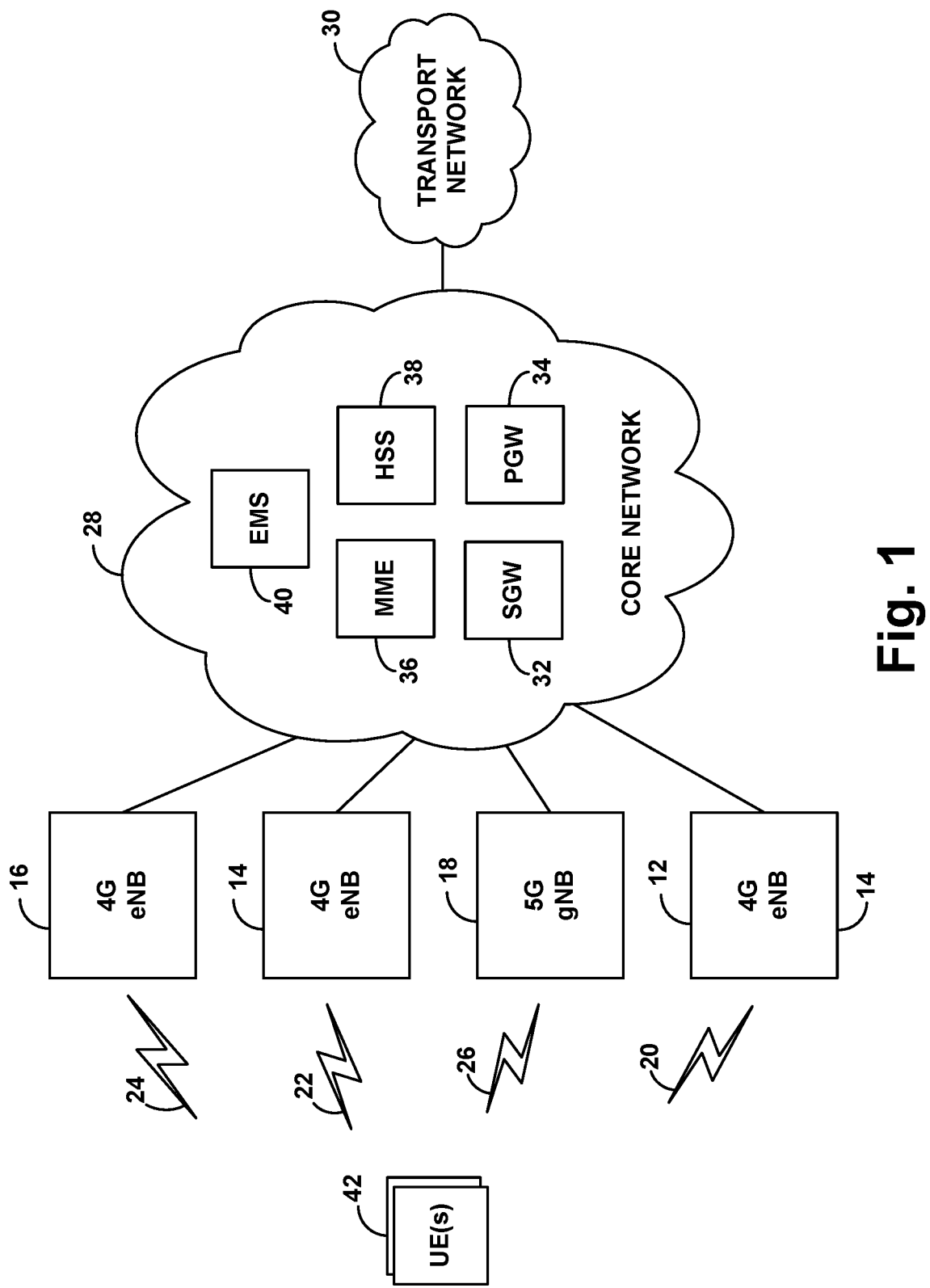
FIG. 1 is a simplified block diagram of an example network arrangement in which aspects of the present disclosure can be implemented.

FIG. 1 is a simplified block diagram of an example network arrangement that includes four example access nodes, namely, three 4G access nodes (4G eNBs) 12, 14, 16, and a 5G access node (5G gNB) 18. Each of these access nodes could be a macro access node of the type configured to provide a wide range of coverage or could take other forms, such as a small cell access node, a relay, a femtocell access node, or the like, possibly configured to provide a smaller range of coverage. And the access nodes could vary in form from each other.

In the example illustrated, each access node is configured to provide coverage and service on at least one carrier. Namely, 4G eNB 12 is configured to provide 4G coverage and service on at least one carrier 20, 4G eNB 14 is configured to provide 4G coverage and service on at least one carrier 22, 4G eNB 16 is configured to provide 4G coverage and service on at least one carrier 24, and 5G gNB 18 is configured to provide 5G coverage and service on at least one carrier 26. Though the access nodes could possibly share RF spectrum.

To facilitate providing service and coverage on the illustrated carriers, the access nodes could have a respective antenna structures, such as an antenna array, that is configured to transmit and receive electromagnetic signals in a region defined by an antenna pattern or radiation pattern, or the access nodes could share portions of a common antenna array for this purpose. And the access nodes could include other communication equipment, such as baseband units, radio heads, power amplifiers, and the like.

The air interface on each of these carriers could be structured as described above by way of example, being divided over time into frames, subframes, and symbol time segments, and over frequency into subcarriers, thus defining an array of air-interface resource elements grouped into PRBs allocable by the respective access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In a representative arrangement, each of the illustrated access nodes could be interfaced with a core network 28 that provides connectivity with at least one transport network 30 such as the Internet. The core network 28 could be a packet-switched network such as an industry standard Evolved Packet Core (EPC) network or Next Generation Core (NGC) network. In the example shown, for instance, the core network 16 could be an EPC network including a serving gateway (SGW) 32, a packet data network gateway (PGW) 34, a mobility management entity (MME) 36, a home subscriber server (HSS) 38, and an element management system (EMS) 40, although other arrangements are possible as well.

Without limitation, each access node could have an interface with the SGW 32, the SGW 32 could have an interface with the PGW 34, and the PGW 34 could provide connectivity with the transport network 30. Further, each access node could have a control-plane interface with the MME 36, and the MME 36 could have a control-plane interface with the SGW 32, so that the MME 36 could coordinate setup of bearers for UEs. Alternatively, just the 4G eNBs 12, 14, 16 might have a control-plane interface with the MME 36 and may function as an anchor for control signaling with the MME 36 for 4G service and possibly for EN-DC service.

Still further, the HSS 38 could store or have access to UE profile records, which could specify service-subscription plans, UE configurations, and/or other such UE capability information, such as whether a UE is EN-DC capable for instance. And the EMS 40 could operate as a central repository of operational data for the wireless communication network and to control and manage operation of various network elements such as the access nodes.

Also without limitation, while 4G eNBs 12, 14, 16 each support providing 4G coverage and service, just 4G eNB 14 and possibly 4G eNB 12 might support providing EN-DC service, and 4G eNB 16 may provide just 4G service. For instance, 4G eNB 14 could be programmed with logic that enables the 4G eNB 14 to function as an MN to set up EN-DC service for a UE that connects with the 4G eNB 14 in the manner discussed above. Whereas 4G eNB 16 may not be programmed with such logic and may therefore be limited to providing UEs with standalone 4G service and not EN-DC service.

In practice, each 4G eNB may also broadcast for receipt by UEs within its coverage an indication of whether the 4G eNB supports providing EN-DC service. For instance, each 4G eNB could include this indication in a MIB or SIB broadcast by the 4G eNB. A UE within good coverage of multiple such 4G eNBs may then receive and use those broadcast indications as a basis to decide which 4G eNB to connect with. For instance, if the UE supports EN-DC service and/or prefers to operate with EN-DC service, then the UE may opt to connect with 4G eNB 14 rather than 4G eNB 16 on grounds that 4G eNB 14 supports providing EN-DC service and 4G eNB 16 does not.

FIG. 1 also illustrates a number of example UEs 42 that may from time to time be within coverage of one or more of the illustrated access nodes. Each of these UEs could take any of the forms noted above, among other possibilities. Further, all of the UEs might be EN-DC capable, equipped with a 4G LTE radio, a 5G NR radio, and associated circuitry and logic that enables the UEs to engage in 4G LTE service, 5G NR service, and EN-DC service.

In line with the discussion above, from time to time, various such UEs may connect with EN-DC-capable 4G eNB 14, and 4G eNB 14 may seek to set up EN-DC for each such UE, using 5G gNB 18 and/or one or more other 5G gNBs (not shown) as SN for the EN-DC service.

For instance, each of one or more such UEs could initially discover coverage of the 4G eNB 14, such as by scanning predefined 4G carriers to find a synchronization signal from the 4G eNB 14 and then determining that a reference signal from the 4G eNB 14 is strong enough to justify connecting. The UE could then engage in random-access signaling and RRC signaling with the 4G eNB 14 to establish an RRC connection, and the 4G eNB 14 could establish a context record indicating the state of the UE's 4G connection and service.

With its RRC connection established, the UE could then transmit to the 4G eNB 14 an attach request message, which the 4G eNB 14 could forward to the MME 36 for processing. And upon authenticating and authorizing the UE for service, the MME 36 and 4G eNB 14 could coordinate setup for the UE of at least one user-plane bearer. For instance, the MME 32 could engage in signaling with the 4G eNB 14 and the SGW 32 to coordinate setup for the UE of an S1-U packet tunnel between the 4G eNB 14 and the SGW 32, and the SGW 32 could responsively engage in signaling with the PGW 34 to coordinate setup for the UE of an associated S5 packet tunnel between the SGW 32 and the PGW 34. Further, the 4G eNB 14 could engage in signaling with the UE to establish an associated a DRB of the UE's 4G connection.

In relation to this attachment process, the 4G eNB 14 could also transmit to the UE an RRC message carrying a UE-capability enquiry, and the UE could respond to the 4G eNB 14 with a "UE capability information" information element (IE), which could indicate that the UE is EN-DC capable. Alternatively, the 4G eNB 14 could receive such capability information from the MME 36, which could obtain the information from a home subscriber server (not shown) or the like.

As the UE is EN-DC capable, the 4G eNB 14 could then work to configure EN-DC service for the UE. In line with the discussion above, for instance, the 4G eNB 14, operating as MN or master eNB (MeNB) could first identify 5G gNB 18 as an SN or secondary gNB (SgNB) to provide secondary connectivity for the UE And the 4G eNB 14 could then engage in a process to add the 5G gNB 18 as an SgNB for the UE. For instance, the 4G eNB 14 could transmit to the 5G gNB 18 an SgNB-Addition request to cause the 5G gNB 18 to allocate resources for a 5G connection for the UE, the 4G eNB 14 could receive an SgNB-Addition-Request acknowledge message from the 5G gNB 18, and the 4G eNB 14 could engage in in associated RRC signaling with the UE, in response to which the UE could then transmit to the 5G gNB 18 a random-access signal and the 5G gNB 18 could respond to the UE. Further, the 4G eNB 14 may engage in signaling as described above to transfer to the UE's S1-U tunnel to the 5G gNB as well.

If this SgNB-addition process works, then the 4G eNB 14 and 5G gNB 18 could then provide the UE with EN-DC service, concurrently serving the UE over their respective connections with the UE. Namely, the 4G eNB 14 could allocate PRBs of its 4G air interface as needed to carry data on the UE's 4G connection between the 4G eNB 14 and the UE, and the 5G gNB 18 could allocate PRBs of its 5G air interface as needed to carry data on the UE's 5G connection between the 5G gNB 18 and the UE.

As noted above, however, this or another such SgNB-addition process may sometimes fail for various reasons, such as but not limited issues with signaling between the 4G eNB 14 and 5G gNB 18 and/or issues with signaling between the UE and the 5G gNB 18. When the SgNB-addition process fails for a given UE, the 4G eNB 14 may then simply proceed to serve that UE with standalone 4G service, and the time and effort to attempt setup of EN-DC for the UE would have been wasted.

Per the present disclosure as indicated above, a computing system could use the extent to which 4G eNB 14 has experienced SgNB-addition failure in the past as a basis to control whether a UE that is not yet connected with the 4G eNB 14 should connect with the 4G eNB 14 as the UE's primary serving access node. For instance, the computing system could use the SgNB-addition failure history of the 4G eNB 14 as a basis to control whether a UE initially seeking wireless connectivity should connect with the 4G eNB 14. Or the computing system could use the SgNB-addition failure history of the 4G eNB 14 as a basis to control whether a UE that is going to hand over from another 4G eNB should hand over to 4G eNB 14.

If the 4G eNB 14 has had a threshold high rate of SgNB-addition failures in the past, then, based at least on that fact, the computing system could avoid having the UE connect with the 4G eNB 14. Whereas, if the 4G eNB 14 has not had a threshold high rate of SgNB addition failures in the past, then, based at least on that fact, the computing system may allow the UE to connect with the 4G eNB 14.

The computing system that carries out this process could be provided at various entities. By way of example, in a scenario where the UE is initially seeking wireless connectivity or is scanning for potential handover, the computing system could be provided at the UE itself, such as by a processor programmed to carry out the process. And as another example, in a scenario where another access node is serving the UE and is considering handover of the UE, the computing system could be provided at that other access node, likewise by a processor programmed to carry out the process. Other examples are possible as well.

To facilitate this process, the computing system could have access to data that indicates an extent to which the 4G eNB 14 has experienced SgNB-addition failures, each SgNB-addition failure being a past instance where the 4G eNB 14, as MeNB (i.e., MN) attempted SgNB-addition to add secondary connectivity for a UE connected primarily with the 4G eNB 14 and the attempted SgNB-addition failed.

Various entities could detect occurrences of these SgNB-addition failures and compile this data in order to make the data available to the computing system for use in carrying out this process.

In practice, for instance, the 4G eNB 14 itself could detect instances of these SgNB-addition failures such as by detecting absence or other failure signaling associated with the SgNB-addition process. Further, 5G gNBs with which the 4G eNB 14 seeks to add secondary connectivity for UEs could detect instances of the SgNB-addition failures likewise by detecting absence or other failure of signaling associated with the SgNB-addition process. And still further, UEs for which the 4G eNB 14 seeks to add secondary connectivity could detect instances of the SgNB-addition failures also by detecting absence or other failure of signaling associated SgNB addition process.

Each such entity could maintain timestamped records of these instances of the 4G eNB 14 experiencing SgNB-addition failure. Further, each such entity could report those records to one or more other entities, and any such entity could aggregate, roll up, and process the data to establish one or more representative statistical measures of the extent to which the 4G eNB 14 has experienced SgNB-addition failure. And any such entity could make this information available for use by other entities. Without limitation, for example, an entity could maintain a record of a rate of such SgNB-addition failures, such as a total number of such failures experienced by the 4G eNB 14 over a recent sliding window of time and could make that rate information available to others.

For instance, the 4G eNB 14 could aggregate records of its own detected instances and instances detected and reported by various 5G gNBs, to establish a representative measure of the extent to which the 4G eNB 14 has experienced SgNB-addition failure, and the 4G eNB 14 could report a latest such representative measure to the EMS 40, could broadcast a latest such representative measure in a MIB or SIB message for receipt by UEs in its coverage, and/or could make such information available for querying by others. Further, the EMS 40 could aggregate records of instances reported by the 4G eNB 14 and by various 5G gNBs, to likewise establish a representative measure and could make that information available for querying by others. And still further, a UE that has been a subject of one or more SgNB-addition failures of the 4G eNB 14 in the past might also establish and maintain its own such representative measure of the extent to which that 4G eNB 14 has experienced SgNB-addition failure.

In an example implementation as noted above, the computing system that makes use of this data to control whether a UE will connect with the 4G eNB 14 could be at the UE itself.

For instance, in the arrangement of FIG. 1, this could occur when the UE is not yet connected with an access node and is seeking to acquire initial wireless connectivity, in which case the UE may scan for coverage and discover that the UE is within threshold strong coverage of 4G eNB 14 and possibly also threshold strong coverage of 4G eNB 16. In that scenario, as noted above, the UE might normally opt to connect with 4G eNB 14 on grounds that 4G eNB 14 supports EN-DC. But in accordance with the present disclosure, the UE might determine whether 4G eNB 14 has experienced a threshold high extent of SgNB-addition failures (e.g., a rate of such failures that is at least as high as a predefined threshold rate deemed to be possibly problematic), and the UE could base its decision at least on that determination.

For example, taking into account past-SgNB-addition-failure information broadcast by the 4G eNB 14 and/or any past experience of the UE being the subject of SgNB-addition failure by the 4G eNB 14, the UE could determine whether the 4G eNB 14 has experienced a threshold high extent of SgNB-addition failures. If the UE determines that the 4G eNB 14 has experienced a threshold high extent of SgNB-addition failures, then, based at least on that determination, the UE could decide to not connect with the 4G eNB 14 and could thus cause itself to operate accordingly, possibly connecting with 4G eNB 16 instead.

Alternatively, in the arrangement of FIG. 1, this could occur when the UE is connected with another access node such as 4G eNB 12 and is scanning for possible handover from that other access node. In this scenario, the UE might likewise scan for coverage and detect that the UE is within threshold strong coverage of 4G eNB 14 and possibly also threshold strong coverage of 4G eNB 16. The UE could then apply the process just described to determine whether the 4G eNB 14 has experienced a threshold high extent of SgNB-addition failures. But here, the UE could use that determination as a basis to decide whether to hand over to the 4G eNB 14 such as whether to report to the UE's current serving access node that the UE is within threshold strong coverage of 4G eNB 14.

For instance, if the UE determines that the 4G eNB 14 has experienced a threshold high extent of SgNB-addition failures, then, based at least on that determination, the UE could decide to not report to its serving access node that the UE is within threshold strong coverage of 4G eNB 14 (even though the UE is within threshold strong coverage of 4G eNB 14), or take other action to not hand over to the 4G eNB 14. And the UE could thus cause itself to operate accordingly, possibly instead taking action hand over to 4G eNB 16.

In another example implementation as noted above, the computing system that makes use of this data to control whether a UE will connect with the 4G eNB 14 could be at an access node with which the UE is currently connected, when that access node is considering whether to hand over the UE to the 4G eNB 14. For instance, in the arrangement of FIG. 1, if the UE is currently connected with 4G eNB 12 (e.g., as the UE's sole serving access node or as an MeNB for EN-DC service of the UE) and the UE has reported to 4G eNB 12 that the UE is within threshold strong coverage of both 4G eNB 14 and 4G eNB 16. At issue in that scenario could be which 4G eNB to hand over the UE to.

In this scenario, the UE's serving access node 4G eNB 12 could determine the whether the 4G eNB 14 has experienced a threshold high extent of SgNB-addition failures (e.g., at least a predefined threshold high rate of such failures), and the 4G eNB 12 could base its decision at least on that determination.

For example, 4G eNB 12 could query 4G eNB 14 (e.g., as part of tentative handover messaging with the 4G eNB 14) or EMS 40 to determine an extent to which the 4G eNB 14 has experienced SgNB-addition failures in the past and to determine whether the 4G eNB 14 has experienced a threshold high extent of such SgNB-addition failures. And if 4G eNB 12 determines that the 4G eNB 14 has experienced a threshold high extent of SgNB-addition failures, then, based at least on that determination, the 4G eNB 12 could decide to not hand over the UE to the 4G eNB 14 and could thus cause itself to operate accordingly, possibly handing over the UE instead to 4G eNB 16.

Figure 2:
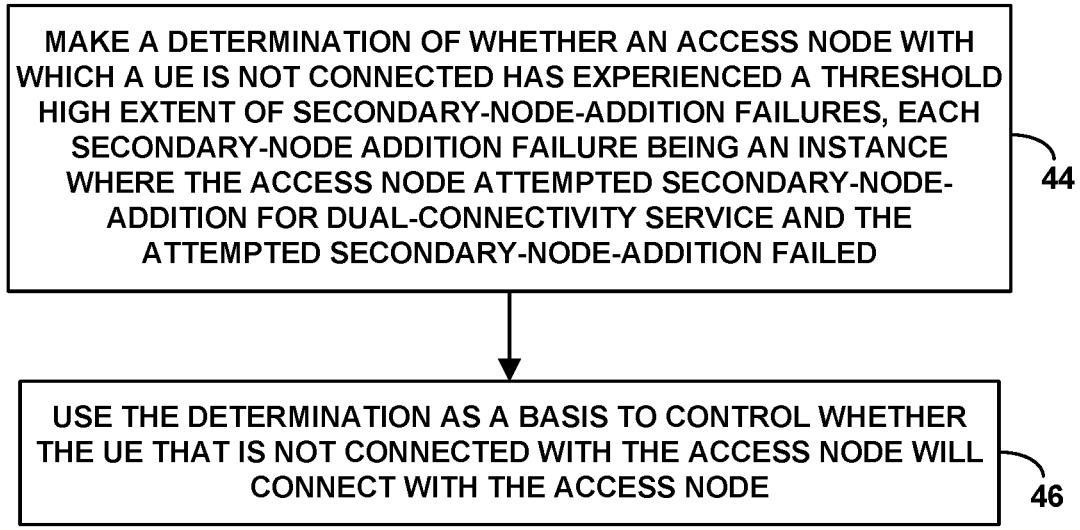
FIG. 2 is a flow chart depicting an example method that could be carried out in accordance with the disclosure.

FIG. 2 is next a flow chart depicting a method that could be carried out in accordance with the present disclosure, to control whether a UE that is not connected with an access node will connect with the access node. As shown in FIG. 2, at block 44, the method includes making a determination of whether the access node has experienced a threshold high extent of secondary-node-addition failures, each secondary-node addition failure being an instance where the access node attempted secondary-node-addition for dual-connectivity service (e.g., where the access node was a primary serving access node seeking to add secondary connectivity with a secondary access node) and the attempted secondary-node-addition failed. And at block 46, the method includes using the determination as a basis to control whether the UE that is not connected with the access node will connect with the access node.

In line with the discussion above, in this method, the act of using the determination as a basis to control whether the UE that is not connected with the access node will connect with the access node could involve, responsive to at least the determination being that the access node has experienced a threshold high extent of secondary-node-addition failures, causing the UE to not connect with the access node. For instance, the access node could be a first access node, and the act of causing the UE to not connect with the first access node could involve causing the UE to connect with a second access node instead of connecting with the first access node.

As further discussed above, this method could be carried out by the UE. For instance, the method could be carried out by the UE when the UE is not connected with any access node and is seeking initial wireless connectivity. Or the access node could be a target access node and the method could be carried out by the UE when the UE is connected with a source access node, in which case using the determination as a basis to control whether the UE that is not connected with the target access node will connect with the target access node could involve using the determination as a basis to control whether the UE will hand over from being connected with the source access node to being connected instead with the target access node. Further, the act of making the determination of whether the access node has experienced the threshold high extent of secondary-node-addition failures could involve the UE making the determination based on secondary-node-addition-failure information broadcast by the access node and/or past experience of the UE as a subject of secondary-node-addition failure experienced by the access node.

Alternatively, as discussed above, the method could be carried out by a source access node with which the UE is currently connected, in which case the access node could be a target access node, and the act of using the determination as a basis to control whether the UE that is not connected with the target access node will connect with the target access node could involve using the determination as a basis to control whether to hand over the UE from being connected with the source access node to being connected instead with the target access node. Further, the act of making the determination of whether the target access node has experienced the threshold high extent of secondary-node-addition failures could involve the source access node querying the target access node as a basis to make the determination and/or the source access node querying an element management system or the like as a basis to make the determination.

Figure 3:
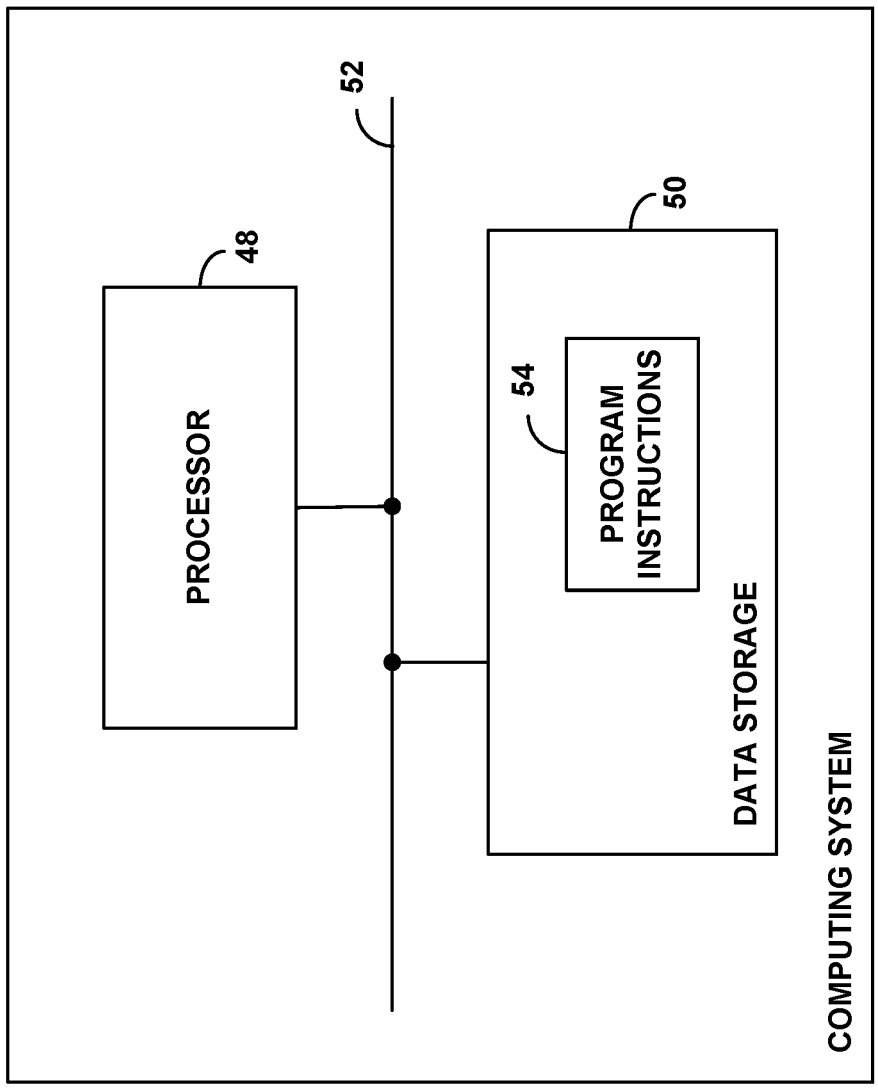
FIG. 3 is a simplified block diagram of an example computing system operable in accordance with the disclosure.

FIG. 3 is next a simplified block diagram of an example computing system that could be configured to control whether a UE that s not connected with an access node will connect with the access node. As shown in FIG. 3, the example computing system includes a processor 48 and non-transitory data storage 50, which could be integrated together and/or interconnected by a system bus, network, or other connection mechanism 52.

The processor 48 could comprise one or more general purpose processors (e.g., microprocessors) and/or one or more special-purpose processors (e.g., application specific integrated circuits). And the data storage 50 could comprise one or more volatile and/or non-volatile storage components (e.g., magnetic, optical, or flash storage), necessarily non-transitory. Further, as shown, the data storage 50 could store program instructions 54, which could be executable by the processor 48 to cause the computing system to carry out various operations described herein, such as those described above in connection with FIG. 2.

Various features described above can be implemented in this context as well, and vice versa.

For example, as discussed above, the computing system could be provided at the UE and could operate to control whether the UE acquires initial wireless connectivity with the access node or the UE hands over to the access node. Or the computing system could be provided at a source access node with which the UE is currently connected and that is considering whether to hand over the UE to the access node at issue. Other examples are possible as well.

Figure 4:
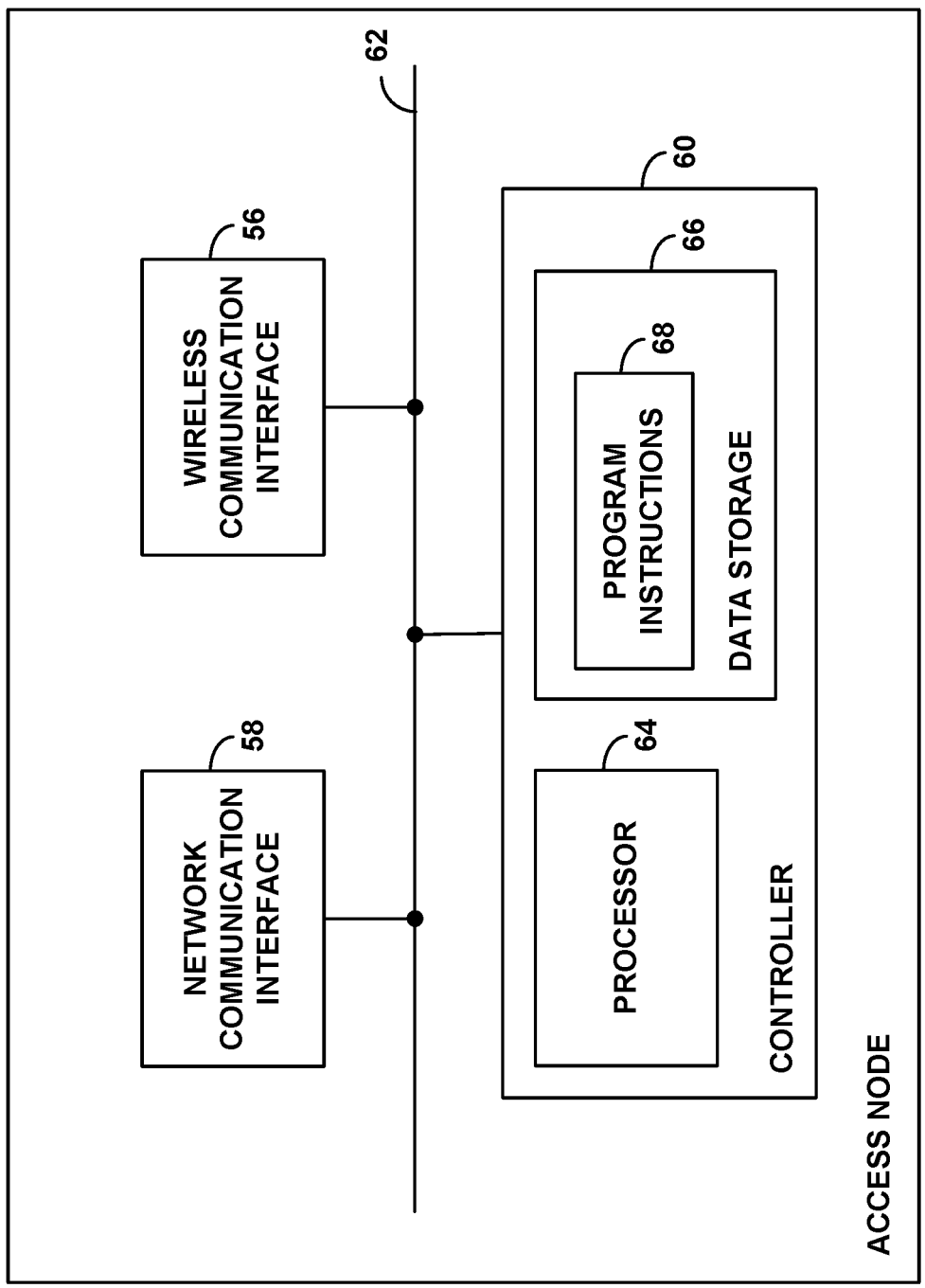
FIG. 4 is a simplified block diagram of an example access node operable in accordance with the disclosure.

FIG. 4 is next a simplified block diagram of an example access node that could be configured to carry out various features described herein. As shown in FIG. 4, the example access node includes a wireless communication interface 56, a network communication interface 58, and a controller 60, all of which could be integrated together and/or communicatively linked together by a system bus, network, or other connection mechanism 62.

In an example implementation, the wireless communication interface 56 could comprise an antenna structure, which could be tower mounted or could take other forms, and associated components such as a power amplifier and a wireless transceiver, so as to facilitate providing a coverage area defining an air interface and engaging air-interface communication on the air interface. And the network communication interface 58 could comprise a wired or wireless interface, such as an Ethernet network communication interface, configured to support communication with other entities, such as with the other access nodes and various core-network entities.

Further, controller 60 could be configured to carry out various operations described herein, such as those described above in connection with FIG. 2. For instance, as shown, the controller could include a processor 64, such as one or more processing units (e.g., one or more general purpose processors and/or specialized processors), and a non-transitory computer readable-medium (e.g., one or more volatile and/or non-volatile storage components (e.g., magnetic, optical, or flash storage), necessarily non-transitory) 66 storing program instructions 68 executable by the processor 64 to carry out those operations.

Various other features discussed herein can be implemented in this context as well, and vice versa.

Figure 5:
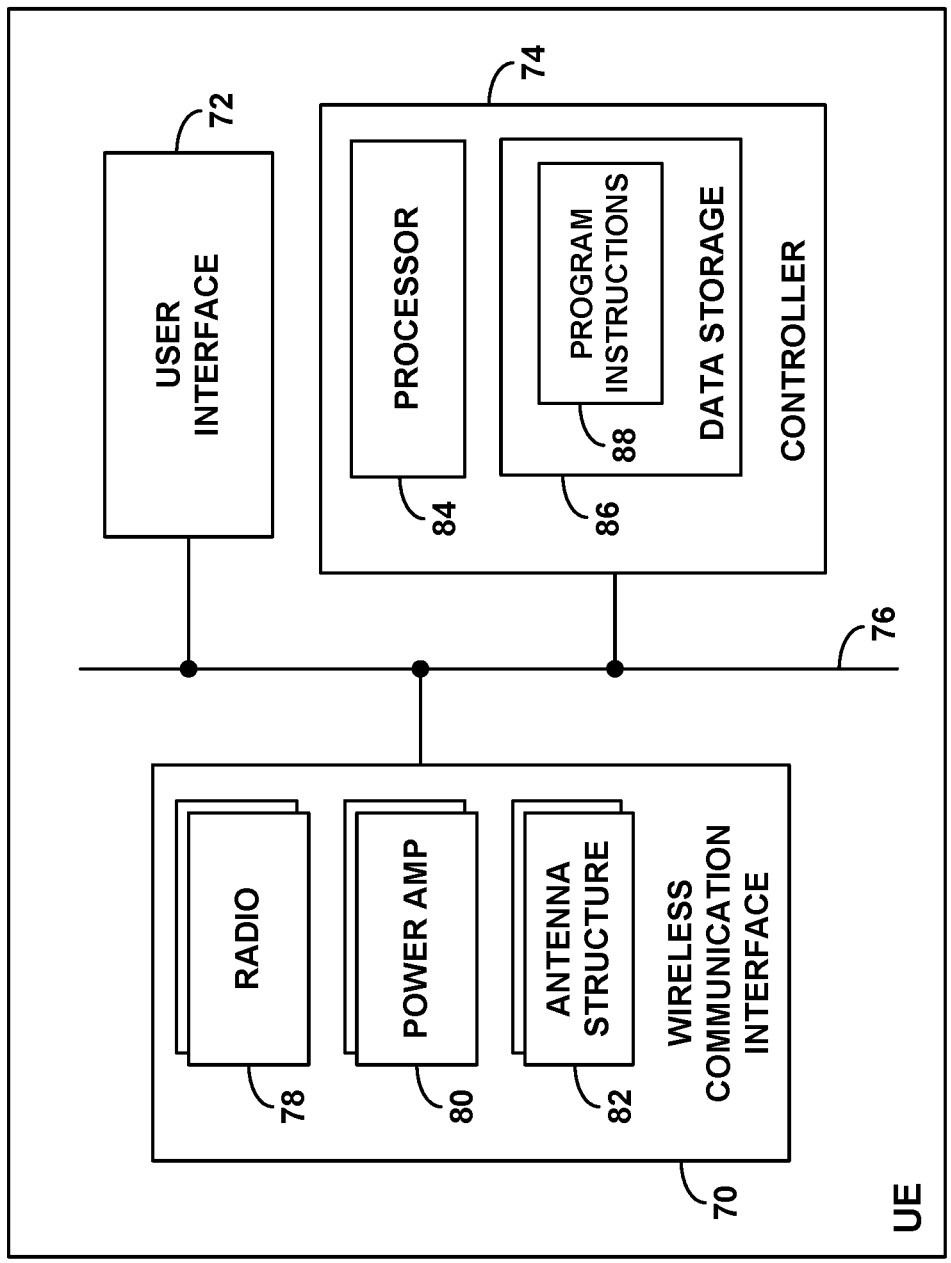
FIG. 5 is a simplified block diagram of an example UE operable in accordance with the disclosure.

Finally, FIG. 5 is a simplified block diagram of an example UE that could be configured to carry out various features described herein. As shown in FIG. 5, the example UE includes a wireless communication interface 70, a user interface 72, and a controller 74, which could likewise be integrated together and/or communicatively linked together by a system bus, network, or other connection mechanism 76.

The wireless communication interface 70 could operate to support and thus facilitate air interface communication concurrently on a first connection and a second connection, such as EN-DC service for instance. As shown, for instance, the wireless communication interface 70 could include multiple radios 78, one or more power amplifiers 80, and one or more antenna structures 82.

The user interface 72, which could be included if the UE is user operated, could include input and output components (not shown) to facilitate interaction with a user. For instance, the user interface could include analog-to-digital conversion circuitry and could include input components such as a touch screen, microphone, and keypad, and output components such as a display screen and sound speaker.

And the controller 74, which could be integrated with wireless communication interface 70 (e.g., on a common chipset) or provided in another manner, could operate to carry out or cause the UE to carry out various operations described herein, such as those discussed above in connection with FIG. 2. For instance, the controller could include a processor 84, such as one or more processing units (e.g., one or more general purpose processors and/or specialized processors), and a non-transitory computer readable-medium (e.g., one or more volatile and/or non-volatile storage components (e.g., magnetic, optical, or flash storage), necessarily non-transitory) 86 storing program instructions 88 executable by the processor 84 to carry out those operations.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A wireless communication method performed by an access node comprising:
   making a determination of whether the access node has experienced a threshold high extent of secondary-node-addition failures,
   wherein the threshold high extent is a predefined threshold rate deemed to be problematic,
   each of the secondary-node-addition failures being an instance where the access node attempted secondary-node-addition for dual-connectivity service and the attempted secondary-node-addition failed,
   wherein each instance of the access node attempting secondary-node-addition for dual-connectivity service comprises,
   when a user equipment (UE) has a primary connection with the access node,
   the access node attempting to add for the UE a secondary connection with another access node so that the UE would have dual connectivity including the primary connection and the secondary connection; and
   using the determination as a basis to control whether the UE that is not connected with the access node will connect with the access node as the UE's primary serving access node;
   wherein,
   if the access node has not experienced a threshold high extent of secondary-node-addition failures, the UE connects with the access node; and
   if the access node has experienced a threshold high extent of secondary-node-addition failure, the UE does not connect with the access node.

2. The method of claim 1, wherein using the determination as a basis to control whether the UE that is not connected with the access node will connect with the access node comprises:
   responsive to at least the determination being that the access node has experienced a threshold high extent of secondary-node-addition failures, causing the UE to not connect with the access node.

3. The method of claim 2, wherein the access node is a first access node, and wherein causing the UE to not connect with the first access node comprises causing the UE to connect with a second access node instead of connecting with the first access node.

4. A computing system comprising:
   a processor;
   non-transitory data storage; and program instructions stored in the non-transitory data storage and executable by the processor to carry out operations including:

making a determination of whether the access node has experienced a threshold high extent of secondary-node-addition failures,
wherein the threshold high extent is a predefined threshold rate deemed to be problematic,
each of the secondary-node-addition failures being an instance where the access node attempted secondary-node-addition for dual-connectivity service and the attempted secondary-node-addition failed,
wherein each instance of the access node attempting secondary-node-addition for dual-connectivity service comprises,
when a user equipment (UE) has a primary connection with the access node, the access node attempting to add for the UE a secondary connection with another access node so that the UE would have dual connectivity including the primary connection and the secondary connection, and
using the determination as a basis to control whether the UE that is not connected with the access node will connect with the access node as the UE's primary serving access node;
wherein,
if the access node has not experienced a threshold high extent of secondary-node-addition-failures, the UE connects with the access node; and
if the access node has experienced a threshold high extent of secondary-node-addition-failures, the UE does not connect with the access node.

5. The computing system of claim 4, wherein usmg the determination as a basis to control whether the UE that is not connected with the access node will connect with the access node comprises:
responsive to at least the determination being that the access node has experienced a threshold high extent of secondary-node-addition failures, causing the UE to not connect with the access node.

6. The computing system of claim 5, wherein the access node is a first access node, and wherein causing the UE to not connect with the first access node comprises causing the UE to connect with a second access node instead of connecting with the first access node.

7. The computing system of claim 4, wherein the computing system is at the UE.

8. The computing system of claim 7, wherein the access node is a target access node, wherein the operations are executable when the UE is connected with a source access node, and wherein using the determination as a basis to control whether the UE that is not connected with the target access node will connect with the target access node comprises using the determination as a basis to control whether the UE will hand over from being connected with the source access node to being connected instead with the target access node.

9. The computing system of claim 7, wherein making the determination of whether the access node has experienced the threshold high extent of secondary-node-addition failures comprises making the determination based on at least one factor selected from the group consisting of (i) secondary-node-addition-failure information broadcast by the access node and (ii) past experience of the UE a subject of secondary-node-addition failure experienced by the access node.

10. The computing system of claim 4, wherein the access node is a target access node, wherein the computing system is at a source access node with which the UE is currently connected, and wherein using the determination as a basis to control whether the UE that is not connected with the target access node will connect with the target access node comprises using the determination as a basis to control whether to hand over the UE from being connected with the source access node to being connected instead with the target access node.

11. The computing system of claim 10, wherein making the determination of whether the target access node has experienced the threshold high extent of secondary-node-addition failures comprises at least one operation selected from the group consisting of (i) the source access node querying the target access node as a basis to make the determination and (ii) the source access node querying an element management system as a basis to make the determination.

12. An access node comprising:
a wireless communication interface through which the access node is configured to engage in air-interface communication;
a backhaul communication interface; and
a controller configured to carry out operations including
(i) making a determination of whether the target access node has experienced a threshold high extent of secondary-node-addition failures,
wherein the threshold high extent is a predefined threshold rate deemed to be problematic,
each of the secondary-node-addition failures being an instance where the target access node attempted secondary-node-addition for dual-connectivity service and the attempted secondary-node-addition failed, and
(ii) using the determination as a basis to control whether to hand a user equipment (UE) over from being connected with the access node to being connected instead with the target access node as the UE's primary serving target access node,
wherein each instance of the target access node attempting secondary-node-addition for dual-connectivity service comprises,
when the UE has a primary connection with the target access node,
the target access node attempting to add for the UE a secondary connection with another access node so that the UE would have dual connectivity including the primary connection and the secondary connection;
wherein,
if the target access node does not have a threshold high extent of secondary-node-addition failures, the UE connects with the target access node; and
if the target access node has a threshold high extent of secondary-node-addition failures, the UE does not connect with the target access node.

13. The access node of claim 12, wherein the controller comprises (i) a processor and (ii) a non-transitory computer-readable medium storing instructions executable by the processor to carry out the operations.

* * * * *